Nov. 2, 1965   H. S. HEMSTREET   3,215,913
VARIABLE TIME-CONSTANT SERVOMECHANISM SYSTEMS
Filed June 14, 1962   3 Sheets-Sheet 1

HAROLD S. HEMSTREET
INVENTOR

BY Richard D. Stephens
ATTORNEY

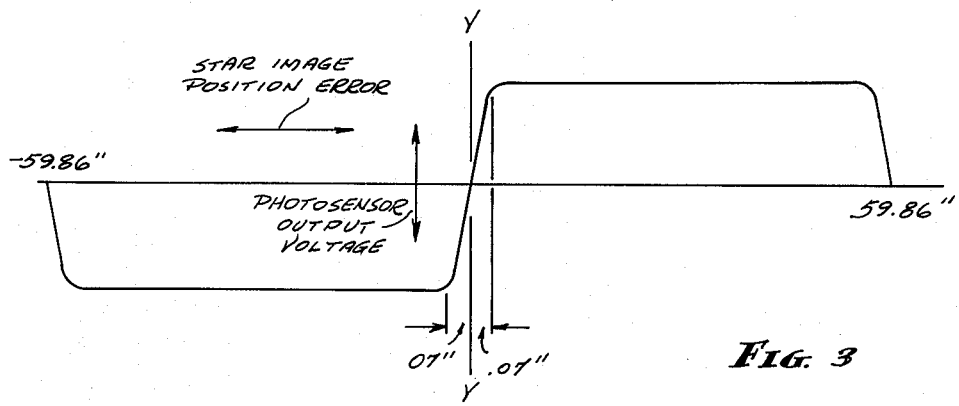
FIG. 3
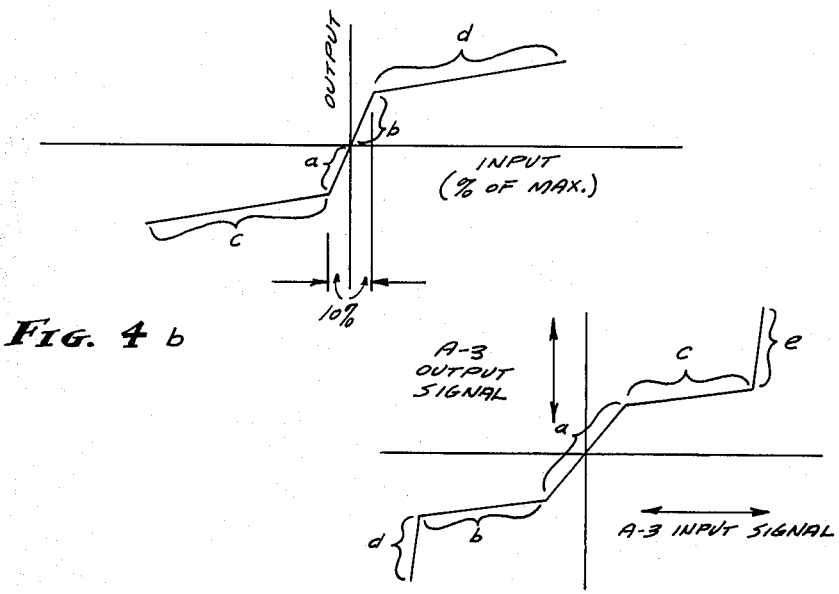
FIG. 4b
FIG. 5b

Nov. 2, 1965   H. S. HEMSTREET   3,215,913
VARIABLE TIME-CONSTANT SERVOMECHANISM SYSTEMS
Filed June 14, 1962   3 Sheets-Sheet 3

HAROLD S. HEMSTREET
INVENTOR

BY Richard T. Stephens
ATTORNEY

United States Patent Office 3,215,913
Patented Nov. 2, 1965

3,215,913
VARIABLE TIME-CONSTANT SERVO-MECHANISM SYSTEMS
Harold S. Hemstreet, Wilton, Conn., assignor of fifty percent to Richard G. Stephens, Binghamton, N.Y.
Filed June 14, 1962, Ser. No. 202,478
9 Claims. (Cl. 318—18)

This invention relates to servomechanism systems, and more particularly, to improved tracking servomechanism systems of an adaptive type which will increase their bandwidth as their velocity increases. The invention is particularly useful in connection with certain types of servomechanism systems which receive their input signals from highly non-linear input transducers. The problems involved in such systems are exemplified by an automatic telescope star-tracking system for which the invention was conceived, although the invention will find utility in a variety of other applications.

In the automatic telescope star-tracking system a "coarse," relatively powerful servomotor was used to bodily position a telescope so as to tend to point it toward a star to be tracked, while a smaller, faster acting "fine" servo carried on the telescope was arranged to adjust a transfer lens in the telescope to make fine corrections in the positions of the images in the final image plane of the telescope. The field viewed by the telescope in such an arrangement will be seen to depend both upon the basic telescope position and the displacement of the transfer lens from a "zero" or reference position in the telescope. Photosensors responsive to the position of an image of a selected star in the final image plane were arranged to provide error signals to operate the transfer lens "fine" servosystem, and the displacement of the transfer lens servo system from the zero position was utilized to provide an error signal to operate the "coarse" telescope servo system.

In order that the fine servo track the star with the best accuracy, it is necessary that the image of the star at the image divider (DP in FIG. 2) be in the best focus. This means the image will be the smallest possible and therefore the output signal (from A–1 in FIG. 2) will saturate or reach a limit for a small displacement of the image and hence for a small displacement of transfer lens (10 in FIG. 2). If an attempt was made to defocus the image to get a linear output from the photodetector over a larger range of image motion, it would be found that the signal to noise ratio had been degraded. Defocusing the image does not reduce the noise in the signal even though the signal (i.e., volt per arc sec. error or equivalent) was reduced.

The range of possible motion of the transfer lens is made large compared to the star image because this is how one achieves the reduction in the severity of performance requirement placed on the coarse servo. (If the fine servo can correct for ±60 arc sec. of telescope error then obviously the telescope (coarse) servo does not need to position the telescope more acurately than this.)

Obviously, however, as the range of motion of the transfer lens gets larger then that part of the transfer lens motion where the error signal from the photosensor is linear gets to be a smaller and smaller percentage of the total possible transfer lens motion. If the fine servo operating range were reduced in an attempt to make photosensor inputs to the fine servo linear over a larger percentage of the fine servo opearting range, the accuracy requirements of the "coarse" servo would then be increased, since it is apparent that the coarse servo gain must be large enough to position the telescope close enough to the star to reduce the final positioning required from the transfer lens to an amount within the operating range of the "fine" transfer lens servo. Although the steady-state accuracy of the fine servo was desired to be as high as possible, it was deemed necessary to limit fine servo frequency response or bandwith to make the servo less responsive to "noise" resulting when the photosensors viewed dim stars. Furthermore, in order to "lock on" and track a star at a fairly high velocity it was necessary that the fine servo have a fairly large velocity error coefficient. Servomechanisms adapted for "locking-on" and tracking inherently are required to begin operation with large error signals, and ideally a tracking servomechanism will reduce its error signal very rapidly so that it "points" exactly at the desired target, and thereafter continues to point exactly at the target as the target moves relative to the telescope, radar or other sensing system which controls the servomechanism. The problems involved in the mentioned star-tracking application are typical of the problems encountered in various other tracking servo applications.

A "coarse-fine" servomechanism system of the above-mentioned type designed in accordance with prior art techniques was found to oscillate in a limit cycle whenever acquisition of a star was attempted with the fine servo initially unbalanced more than the amount required to produce 10% of the maximum signal from the photodetector (i.e., more than about 10% of star image radius). With the fine servo rapidly displaced from balance when an acquisition was attempted, an error signal was promptly developed to drive the "coarse" servo in a direction tending to point the telescope toward the star. With the telescope being angulary driven toward the star and the transfer lens simultaneously being moved by the fine servo to reduce its error signal, both the telescope and the transfer lens will achieve significant velocity by the time the zero error position is reached, and even if the transfer lens servo had good enough response to stop substantially as soon as the zero error position is reached, it will be seen that the transfer lens servo would have to reverse at the zero error position and then assume a position error of the same sense as its initial error if a signal is to be generated to "brake" the coarse servo as it coasts past the zero error position. Stated in an alternative way, the oscillation occurred because the unavoidable response of the coarse servo to the error-signal generated by fine servo displacement from zero position introduced enough phase shift into the fine servo loop so that the phase margin of the fine servo loop vanished and oscillation could occur. The phase margin was already unavoidably low because a conventional lag network was found necessary to restrict the fine servo frequency response to make the system less sensitive to noise.

A variety of other automatic control applications, and in particular those involving "tracking" are confronted with the same problems. In applications where superimposed "coarse" and "fine" servos are controlled from the same input transducer oscillation obviously can be prevented if the coarse servo always moves so slowly relative to the fine servo that it does not affect the fine servo phase margin, but then the overall system may be so slow as to be completely worthless for many tracking applications. Some attempts have been made in the prior art to stabilize coarse-fine systems by provision of various switching schemes, such as by disabling and locking the coarse servo in a fixed position whenever the input signal to the fine servo decreases below a predetermined amount. Such systems involve complex and expensive switching equipment.

While the abovedescribed telescope tracking problem involves a two-motor, or coarse-fine servo system wherein action of the coarse system undesirably reduces the phase margin of the fine system, the invention to be described is applicable as well to many single motor servo systems designed with uncomfortably narrow phase margins, to single motor servo systems controlled by error-deriving transducers which are linear over only a small fraction of their operating range, and in particular to many tracking servos where it is desirable that servo bandwidth increase as tracking velocity increases.

It is a primary object of the invention to provide an improved tracking servomechanism having adaptive capabilities and increased bandwidth with increased tracking velocities.

It is another object of the present invention to provide improved servomechanism systems of either the coarse-fine type or the single motor type in which a high steady-state accuracy requirement, a high tracking velocity capability and a narrow bandwidth-at-steady state requirement tend to reduce considerably the servo stability phase margin.

Other objects of the invention will in part be obvious and will in part appear hereinafter.

The invention accordingly comprises the features of construction, combinations of elements, and arrangement of parts, which will be exemplified in the constructions hereinafter set forth, and the scope of the invention will be indicated in the claims.

For a fuller understanding of the nature and objects of the invention reference should be had to the following detailed description taken in connection with the accompanying drawings, in which:

FIG. 3 is a graph illustrating the nature of the photosensor input transducer of the star-tracking arrangement of FIG. 2;

FIG. 4b is a graph illustrating the gain characteristic of the amplifier of FIG. 4a;

Figure 2:
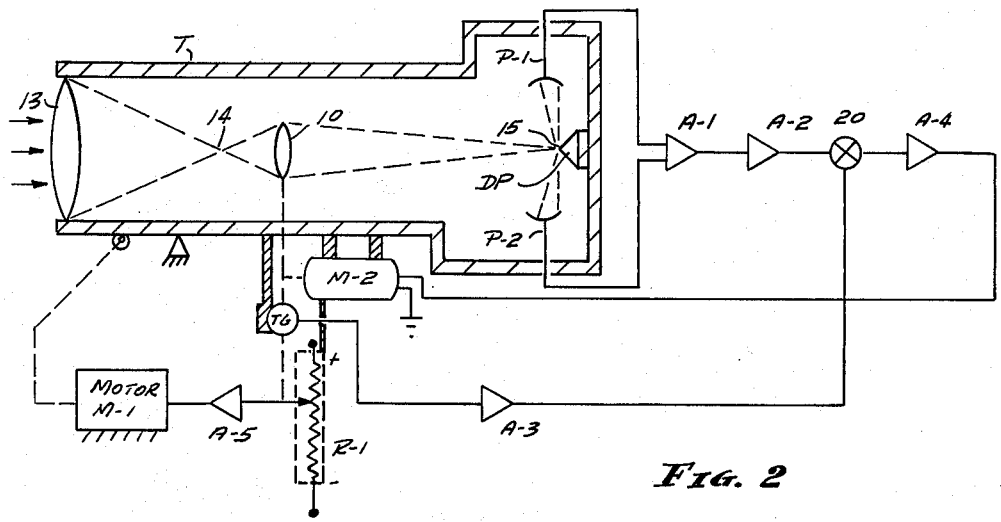
FIG. 2 is a schematic diagram, partially in block form illustrating use of the invention in a telescope star-tracking application.
Figure 6:
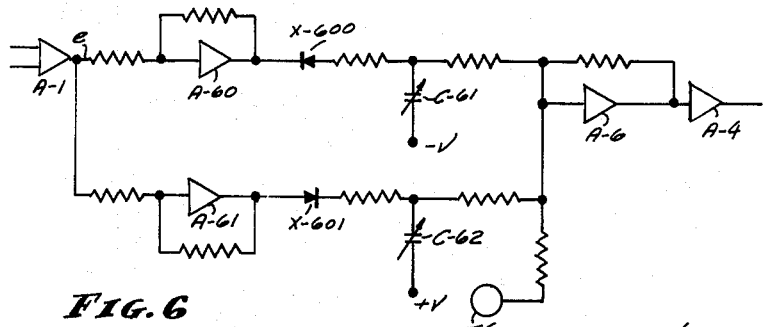
Figure 5A:
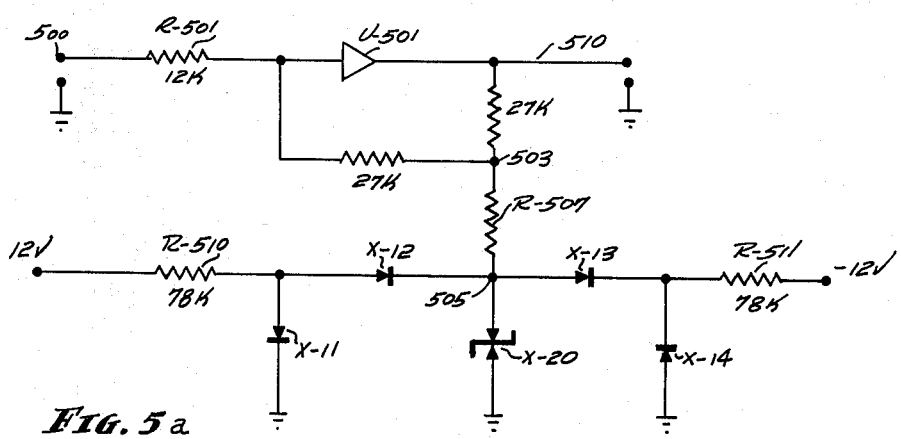
Figure 6B:
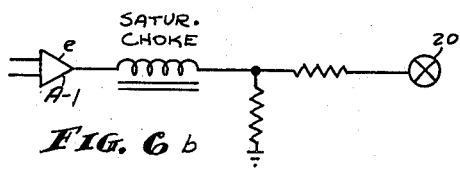

FIG. 5a is a schematic diagram illustrating one form of variable gain, fixed time constant amplifier which may be used as amplifier A–3 of FIG. 2 in practicing the invention, and FIG. 5b is a graph illustrating the gain characteristic of the amplifier of FIG. 5a; and FIGS. 6 and 6b illustrate alternative forms of variable time-constant amplifier circuits which may be used in practicing the invention.

Figure 1:
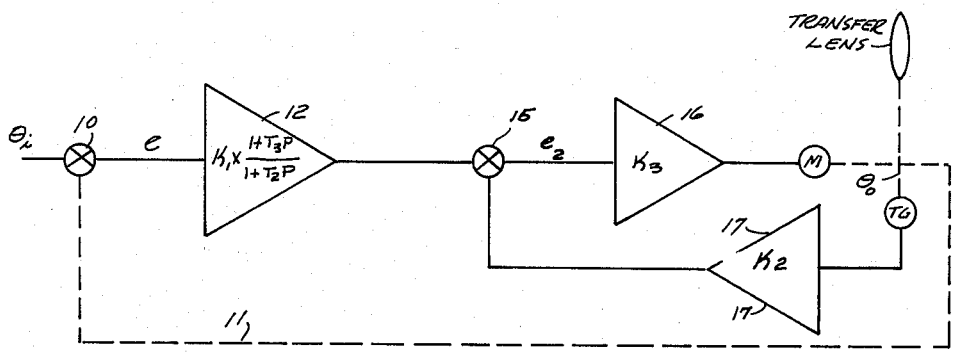
FIG. 1 is a block diagram of an elementary servomechanism system which is useful in understanding the operation and advantages of the invention.

The servomechanism design problems mentioned above may be better understood by reference to the elementary servo block diagram of FIGURE 1. The input or command signal $\theta_i$ to the servo system shown therein is applied to a summing device 10, which compares the $\theta_i$ signal with a position feedback signal $\theta_0$ on line 11 to derive an error signal $e$, which is applied to servo signal amplifying apparatus 12, which amplifies error signal $e$ by a factor of $K_1$ and introduces both a lag and a lead to the error signal. The amplified output signal is further compared by summing device 15 with a rate feedback potential $K_2 p \theta_0$ to derive a modified error potential $e_2$, which is amplified by power amplifier 16 and used to drive servomotor M, and a load. The load is shown in FIG. 1 as comprising the transfer lens of the abovementioned telescope tracking system. In such an application $\theta_i$ is the position of the star image to be relayed or reimaged by the transfer lens. The lens moves to correct relayed image position errors at the photosensors. The error signal $e$, is that signal detected by the photosensors. Servomotor M also drives a conventional tachometer generator TG to derive the rate feedback signal.

The transfer function of the elementary servo may be expressed as follows:

$$\frac{\theta_0}{e} = \frac{K_1}{K_2}\left[\frac{1}{p}\right]\frac{1}{1+\dfrac{1+p}{K_2 K_3}} \times \frac{1+T_3 p}{1+T_2 p} \qquad (1)$$

wherein:

$\theta_0$ is the servo output position, $e$ is the servo error signal as shown in FIG. 1, $K_1$ is the error signal gain including the photosensor gain and the gain of amplifier 12, e.g., volts per arc sec.

$K_2$ is the gain of rate feedback including amplifier 17, e.g., volts/arc sec./sec.

$K_3$ is the gain of power amplifier 16, torque constant of the motor, and the inertia of the load, i.e., acceleration of the load per volt of $e_2$, e.g., arc sec. per sec.$^2$ per volt, $T_3$ is the time constant of a conventional lead network shown associated with amplifier 12, and $T_2$ is the time constant of a conventional lag network shown associated with amplifier 12, and $p$ is the differential operator.

The amount of position error which must exist for the servo to be able to track at any given velocity is determined by the quantity $K_1/K_2$, the velocity error coefficient of the servo, and it is desirable that such coefficient be large in order to be able to track at high velocities with small errors.

The bandwidth $W$ of the servo (i.e., the frequency at which servo loop gain becomes unity) may be expressed as follows:

$$W = \frac{K_1}{K_2} \times \frac{T_3}{T_2} \qquad (2)$$

assuming that tachometer loop bandwidth is large compared to servo bandwidth, so that $$1 \gg \frac{\omega}{K_2 K_3}$$

If the servo frequency response is to be kept small, so that the servo will be less sensitive, particularly at steady state, to noise mixed in with input signal $\theta_i$, the bandwidth $W$ is desirably kept small. Inasmuch as the velocity error coefficient $K_1 K_2$ appears in the expression for bandwidth, it will be seen that provision of a high velocity error coefficient to facilitate fast tracking militates against the narrow bandwidth requirement. While it might appear that one could improve servo response by decreasing the lag time constant $T_2$ when error signal $e$ is large, it is difficult to vary the lag circuit time constant without undesirably decreasing the servo velocity error coefficient.

It will be seen that if $K_2$ and $K_1$ are reduced by the same percentage that the servo velocity error coefficient remains unchanged. If $T_2$ is simultaneously reduced, it will be seen from Equation 2 that the bandwidth of the servo will be increased. Thus if $K_1$, $K_2$ and $T_2$ are all decreased when the servo is operating at a large error condition and beginning to "lock-on" a moving star image, it is possible to provide increased bandwidth for large error conditions without affecting the servo velocity error coefficient.

FIG. 2 is a schematic diagram of the telescope tracking apparatus mentioned. Telescope T is mounted to be angularly moved with respect to a frame (not shown) represented by a mechanical ground, thereby to point telescope T at a desired star. In the actual application of the invention, a pair of perpendicularly-opearting servomechanism systems were used, but since the two systems were identical only one system need be described herein for an understanding of the invention. Light from a star being tracked enters telescope T in the direction indicated by the arrow, passing through main lens 13, which forms an image at 14, and which passes to transfer lens 10, which re-images the star at the apex 15 of a divider prism DP, which divides up the light energy from the star equally between photosensors P–1 and P–2 when the star image is centered exactly at apex 15 of prism DP. If the star image is slightly displaced from apex 15 one of the phototsensors will receive more energy and the other will receive less energy. If the star image is displaced even further a condition will be reached where one photocell will receive all the energy and the other none of the energy. The output signals from photosensors P–1 and P–2 are applied to a conventional difference amplifier A–1. When the star image is exactly centered on apex 15 the output signals from the photocells will cancel, providing no output error signal from amplifier A–1, but if the star image is not centered at apex 15, amplifier A–1 will be seen to provide an output signal having a polarity precisely indicative and magnitude roughly indicative of the instantaneous tracking error. As indicated in FIG. 2 transfer lens 10 is adjustably positioned within telescope T by servo motor M–2, thereby to determine the position of the star image relative to apex 15 of divider prism DP. For very accurate positioning of the telescope, it will be seen that small errors in transfer lens position should cause considerable unbalance of the light between the photocells in order to provide a strong error signal, and accordingly, at slightly greater errors in star image position all of the light falls on one photocell, so that the output signal from amplifier A–1 reaches substantially its maximum value upon occurrence of very little transfer lens position error.

The photosensor combination output characteristic is exemplified in FIG. 3, wherein the y—y axis represents the zero error condition in which the incident light falls equally on photocells P–1 and P–2. As the transfer lens position is varied, the difference between the photocell output signals rises sharply and reaches a maximum value in about .07 arc second, after which all of the incident light is directed to one photcell, and the maximum value signal will be obtained for any greater unbalance, up to a point, shown at about 59.86 arc seconds, where the incident light leaves the opposite side of the photocell and either photocell will be activated. The .07 arc second value is for a diffraction limited telescope of 36 inch aperture. The slope of the curve (FIG. 3) at center is such that all energy would be transferred and saturation would occur in .07 sec. Hence this value is used in determining servo loop gain at null. However, the image would have to be displaced not .07 sec., but somewhat more than 0.1 sec. before saturation is complete. All of this is, of course, a result of the way the energy is distributed in the star image on the prism DP, in the specific application described. The photosensor assembly was designed to be operated up to about plus or minus 60 arc seconds, but, as shown, the linear portion of its characteristic is only about .07 arc second, or about 7/6000 of its total operating range.

Figure 4A:
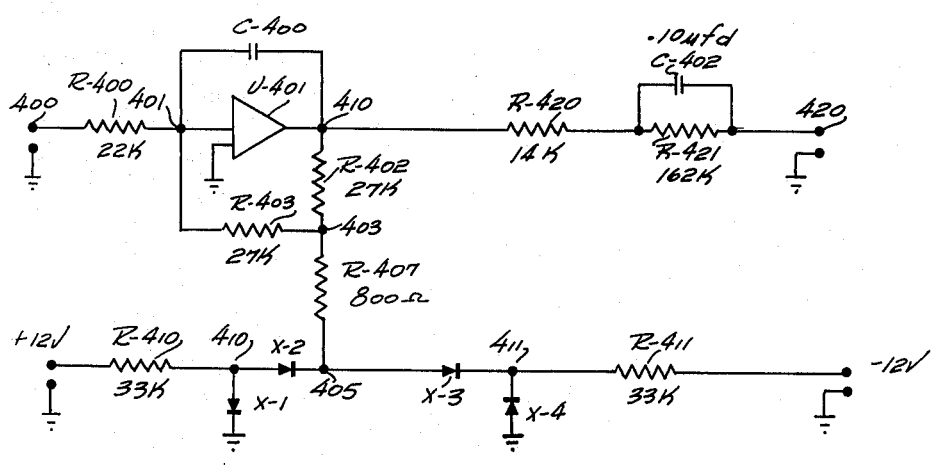
FIG. 4a is a schematic diagram of one form of variable-gain, variable time constant amplifier which may be used in practicing the invention.

Amplifier A–1 of FIG. 2 may be seen to correspond in theory to difference-determining device 10 of FIG. 1, and to provide an output error signal e. Amplifier A–2, and lead and lag networks associated therewith, will be seen to correspond to amplifier 12 of FIG. 1, amplifier A–4 will be seen to correspond to amplifier 16 of FIG. 1, and amplifier A–3 will be seen to correspond to amplifier 17 of FIG. 1. The amplifier A–1 output signal is applied to a variable-gain, variable time constant amplifier A–2, an exemplary form of which is shown in detail in FIG. 4a, and some of the characteristics of which are illustrated by the curve of FIG. 4b, wherein the amplifier output versus input characteristic is shown. At low values of input signal the amplifier is made to have relatively high gain, as indicated by the steep slopes of portions $a$ and $b$ of the curve, so that the servo will track with high steady-state accuracy once it has become balanced and for small amounts of unbalance. The provision of high gain at low values of input signal also tends to overcome errors which otherwise tend to arise from friction in the M–2 fine servo system. However, if the input signal level exceeds certain breakpoint values, as it commonly does during an attempted acquisition or "lock-on," when the servo is first switched on, the A–2 amplifier gain will be sharply reduced, as indicated by the much lesser slopes of portions $c$ and $d$ of the amplifier characteristic. As FIG. 4b illustrates, the desired change in the amplifier time constant, and accompanying change in amplifier gain were made to occur at approximately 10% maximum output of the photosensor input transducer, to reduce both time constant and gain by a factor of ten when the photosensor assembly output signal exceeds approximately 10% of its maximum value. Thus the slopes of the $c$ and $d$ portions in FIG. 4b are 1/10 of those of the $a$ and $b$ portions. The gain of amplifier A–2 of FIG. 2 corresponds to the $K_1$ factor of amplifier means 12 of the elementary diagram of FIG. 1, and hence it will be seen that $K_1$ is reduced as error signal $e$ increases. The reduction in gain in amplifier A–2 results as a by-product of deliberately decreasing the amplifier lag time constant to increase servo bandwidth at higher values of error signal, and ordinarily such a decrease in gain would adversely affect the servo velocity error coefficient and interfere with high speed tracking. As will be shown below, the time constant of the amplifier is deliberately made to vary with input signal level so that the time constant also decreases markedly when the input signal magnitude exceeds one of the breakpoint values, in order to increase the bandwidth of the transfer lens servo system at higher values of error signal when the servo is tracking rapidly than at lower values near a balanced or zero error condition. The output voltage from amplifier A–2 is summed in conventional summing circuit 20 with a modified velocity feedback signal from a rate feedback voltage-deriving device shown as comprising tachometer generator TG, which is driven by transfer lens servo motor M–2. The output signal from tachometer TG commensurate with transfer lens velocity is connected to summing circuit 20 through a further variable gain amplifier A–3, the circuit of which is shown in detail in FIG. 5a, and some of the characteristics of which are illustrated in FIG. 5b. The tachometer amplifier A–3 gain is shown in FIG. 5b as having a first value at small values of input signal, a markedly lower value over an intermediate range of input signal magnitudes, and then a much higher value at arbitrary maximum input signal values. Tachometer amplifier A–3 will be seen to correspond to amplifier 17 of FIG. 1, and the gain of amplifier A–3 and tachometer TG in combination determine the $K_2$ factor of the transfer lens servo system. Now it will be seen that if amplifier A–2 gain is reduced, as its input signal, the servo error signal $e$, increases, thereby to reduce the $K_1$ factor, and if simultaneously the amplifier A–3 gain is reduced by a proportionate amount to reduce the $K_2$ factor, that the servo velocity error coefficient $K_1/K_2$ will remain unchanged, and may be established at a value high enough to obtain desired tracking velocities. In FIG. 5b, portions $b$ and $c$ of the tachometer amplifier gain characteristic have a slope of 1/20 of that of portion $a$, the gain being reduced whenever the amplifier A–3 input signal level increases above approximately that voltage which tachometer generator TG provides (at steady-state) when motor M–2 is driven (via amplifier A–4) with the signal at one of the amplifier breakpoints of FIG. 4b. Thus during an acquistion, when the telescope is being driven to lock onto a star and the photosensor assembly error signal is decreasing, amplifiers A–2 and A–3 reach their breakpoints at approximately the same time, so that amplifier A–2 time constant and gain increase at about the same time that the amplifier A–3 gain increases. The reduction in A–3 amplifier gain in the specific embodiment described was made by a factor of 20 rather than a factor of 10, so that the system velocity error coefficient was not only maintained, but increased for large error signal operation. The marked increase in amplifier A-3 gain at the outer breakpoints is provided solely to establish an arbitrary maximum servo velocity, to prevent excessive servo speeds which might otherwise result if amplifier A-2 gain increases somewhat more steeply or sooner than amplifier A-3 gain during an attempted acquisition. Summing circuit 20 receives the modified error signal from amplifier A-2 and the modified rate feedback signal from amplifier A-3 and operates to provide a further signal which is amplified by a conventional power amplifier A-4 and applied to drive motor transfer lens servo M-2. The output shaft of motor M-2 is mechanically connected to move transfer lens 10 with respect to telescope T, to drive tachometer generator TG and to drive the wiper arm of a further voltage-deriving means shown as comprising potentiometer R-1.

The output voltage on the arm of potentiometer R-1, which represents the transfer lens position with respect to telescope T, is amplified by a conventional servoamplifier A-5, and applied to drive servomotor M-1, which is mechanically connected to pivot telescope T with respect to the frame. Transfer lens 10 is very small, light, low-inertia and fast-acting assembly compared to telescope T. The occurrence of an unbalance, so that the star image falls unequally on the photocells provides an error signal via amplifier A-1, which operates via amplifier A-2, A-4 and motor M-2 to position transfer lens 10 relatively quickly so that the star image will tend to fall more equally onto the two photocells, and translation of transfer lens 10 from its center position positions the arm of potentiometer R-1, deriving a voltage to re-position telescope T via motor M-1. Inasmuch as the position of motor M-1 greatly affects the photosensor input signal, and inasmuch as motor M-1 is driven in accordance with the unbalance of servo M-2, it will be seen that operation of motor M-1 in response to an error signal is delayed until the M-2 servo has been displaced, but then the M-1 servo will tend to continue operating after the M-2 servo is balanced, so that operation of the M-1 servo from the M-2 servo might easily overcome the phase margin of the M-2 servo loop. Utilizing the invention, however, the M-2 servo loop was provided with a phase margin sufficient to prevent oscillation while still achieving the high steady-state accuracy and desired velocity error coefficient.

In the exemplary variable-gain, variable-time constant amplifier circuit of FIG. 4a, the direct input voltage $e$ from difference amplifier A-1 (FIG. 2) is applied via input terminal 400 via scaling resistor R-400 to the summing junction 401 of a special feedback amplifier, which includes a conventional high—"open loop"—gain amplifier U-401 having three direct-coupled stages and associated feedback network components shown in FIG. 4a. Connected between amplifier output terminal 410 and summing junction 401 is capacitor C-400, which tends to integrate, smooth, or lag the amplifier output voltage response to changes in the amplifier input voltage. Also connected from the amplifier output is a direct resistive feedback path including resistor R-403, which is connected at terminal 403 to a voltage divider comprising resistors R-402, R-407 and the impedance to ground of a diode switching network. The voltage gain of the amplifier circuit will be seen to be determined solely by the ratio of the feedback current through feedback resistor R-403 to the input current through scaling resistor R-400. The time constant of the amplifier circuit will be seen to be determined by the effective resistance of the resistive feedback path and the capacitance of capacitor C-400. If the effective feedback resistance can be reduced when the amplifier output exceeds a given level, the amplifier time constant will be reduced thereby providing the desired increased servo bandwidth during large error signal conditions. It will be seen that if the impedance to ground from terminal 405 is very low, that a very small fraction of the amplifier output voltage will be applied to resistor R-403, so that the $\beta$ or feedback factor of the amplifier circuit will be low and the amplifier will have high gain. Conversely, if the impedance to ground from terminal 405 is high, a larger percentage of the amplifier output voltage will be applied degeneratively to summing junction 401, resulting in reduced amplifier gain. Since the variation in impedance to ground from terminal 405 varies the feedback current through resistor R-403, it varies the amplifier time constant as well as the amplifier gain, reducing the amplifier time constant at the same time or same signal level at which the amplifier gain is reduced. The function of the diode switching circuit comprising resistors R-410, R-411 and the four diodes shown is to vary the impedance from terminal 405 to ground as a function of the output voltage at terminal 410, so that the time constant of the overall amplifier circuit is reduced when the amplifier input (and ouput) signal levels exceed a predetermined value in either direction, thereby providing increased servo bandwidth under large error signal conditions. As mentioned above, the tachometer feedback factor is reduced at substantially the same error signal level in order to maintain the servo velocity error coefficient at the desired value.

With zero volts input signal applied to terminal 400, a zero voltage output signal is present at output terminal 410, at terminal 403 and at summing junction 401. Each of the four diodes (X-1 to X-4) will be seen to be forward biased by the applied 12-volt bias supplies, so that current will flow downwardly through X-1, rightwardly through X-2 and X-3, and upwardly through X-4. Inasmuch as resistors R-410 and R-411 are equal and connected to opposite polarity bias supplies, terminal 405 also will be at ground voltage, and no current will be flowing through resistor R-407.

Assume now that a small negative input signal is applied to input terminal 400, so that a positive signal appears at output terminal 410. Terminal 403 necessarily becomes positive, of course, and hence current now will flow downwardly through resistor R-407, decreasing the flow of current through diode X-2. As the amplifier output voltage increases further in the positive direction, the current from resistor R-407 eventually equals the initial current in the opposite direction through diode X-2 and diode X-2 will be cutoff. Thereafter, as output voltage further increases, the additional current from resistor R-407 must flow to the right of terminal 405 as viewed in FIG. 4a, through diode X-3 and then through either X-4 or resistor R-411. Because the diode X-4 forward impedance is much smaller than the resistance of resistor R-411, the additional current from resistor R-407 flows through diode X-4, tending to cancel some of the current which initially flowed upwardly through diode X-4. When the additional current from resistor R-407 equals and begins to exceed the initial current through diode X-4, diode X-4 also will be cutoff, and if the amplifier output voltage increases any further, the additional current through resistor R-407 must return through resistor R-411. It will be seen that at lower signal levels during which increased current through R-407 merely offset or cancelled some of the initial, or zero signal condition current through diodes X-2 and X-4, that the impedance to ground from terminal 403 was the 800-ohm resistance of resistor R-407 and the negligible diode forward resistances, but that as soon as diodes X-2 and X-4 were cut off, that the impedance to ground of terminal 403 increased by 33,000 ohms, the value of resistor R-411. As mentioned above, the increase in this impedance connects a larger percentage of the amplifier output voltage through feedback resistor R-403, thereby decreasing the amplifier time constant, and the amplifier gain, by the same factor and at the same time. Inasmuch as the diode switching circuit of FIG. 4a is symmetrical, it will be apparent without a detailed explanation that the amplifier works similarly for positive input signals, to decrease amplifier time constant and amplifier gain when diodes X-3 and X-1 reach cutoff. In accordance with the invention, the time constant of an element in a servo loop may be altered in response to amplifier input signal level by other known arrangements. For example, in those applications where only a modest change in bandwidth is required, voltage-sensitive variable capacitors (commercially designated "Varicap") may be employed, as shown in FIG. 6. The photosensor output signal e in FIG. 6 is inverted by unity-gain inverting amplifier A-60 and connected to diode X-600, so that voltage-variable capacitor C-61 will charge up whenever error signal e is positive. The error signal e is also connected via amplifier A-61, similar to A-60, to diode X-601 poled oppositely from X-600, to charge voltage-variable capacitor C-62 whenever error signal e is negative. Voltage-variable capacitors C-61 and C-62 increase their capacity as the voltage applied across them increases, and hence capacitors C-61 and C-62 are biased so that the incremental voltage across whichever capacitor is charged decreases as error signal e increases, thereby lessening the circuit time constant as error signal increases. The voltage from the variable capacitors, only one of which will be charged for a given polarity of error signal, are applied to amplifier A-6, a conventional summing amplifier, which is also connected to receive the tachometer generator output. In FIG. 6b the error signal is applied from photosensor amplifier A-1 through a saturable choke, which is designed to saturate at a desired error signal level, thereby decreasing the system inductance and bandwidth for larger error signals. It will be seen that after the error signal increases in FIG. 6b to a point where the saturable choke saturates, the decrease in inductance of the circuit of FIG. 6b as the choke saturates will decrease the time-constant ($L/R$) of the amplifier circuit of FIG. 6b, thereby providing a decreased time-constant at large error signals in the same general manner as the variable time-constant amplifier circuits of FIGS. 4a and 6.

The A-2 amplifier of FIG. 2 also includes a lead-lag circuit shown in FIG. 4a as comprising resistors R-420, R-421 and capacitor C-402, which circuit is connected in series with the A-2 amplifier output terminal 420. As shown in FIG. 2, the A-2 amplifier output signal is applied to a conventional summing circuit 20. Being a current summing device having a low input impedance, the admittance of the R-420, R-421, C-402 network governs the signal applied to the summing circuit. The current $i$ through the network may be expressed as follows:

$$i = E \frac{1 + pR_2C}{1 + pC\frac{R_1R_2}{R_1+R_2}} \left[ \frac{1}{R_1+R_2} \right]$$

where:
$E$ = voltage at terminal 410
$p$ = differential operator
$R_1$ = resistance of R-420
$R_2$ = resistance of R-421
$C$ = capacitance of C-402

The network will be seen to have a lead time constant of $R_2C$ and a lag time constant of $$\frac{R_1R_2C}{R_1+R_2}$$

The operation of the tachometer feedback amplifier of FIG. 5a will be readily understood by comparison with FIG. 4a. Having no feedback capacitor, the tachometer feedback amplifier has no appreciable time constant, and hence the increase of its output voltage to a positive level where diodes X-12 and X-14 cut off, or conversely, to a negative level where diodes X-11 and X-13 cut off, merely changes its gain. As mentioned above, if the reduction in gain of the tachometer amplifier is made as great as the reduction in the A-2 amplifier gain the servo velocity error coefficient will not be undesirably reduced. In practice, it has been found that the A-3 tachometer amplifier gain may be reduced by an even greater factor, thereby providing even a better velocity error coefficient at the large error signal conditions, However, in such an arrangement it is possible for the maximum servo velocity to become extremely high, and to set a definite limit on maximum velocity, the tachometer amplifier was provided with further means shown as comprising zener diode X-20 connected as shown at terminal 505, to break down when the A-3 amplifier output reaches a desired value, thereby shorting terminal 505 to ground and drastically increasing the amplifier gain, to values illustrated by portions d and e of the A-3 amplifier characteristic shown in FIG. 5b.

It will thus be seen that the objects set forth above, among those made apparent from the preceding description, are efficiently attained, and since certain changes may be made in the above constructions without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A position servomechanism, comprising, in combination: transducer means operable upon deviation of a load element from a balanced condition to provide a first signal; first amplifier means operable to amplify said first signal to provide a second signal; means for comparing said second signal with a first feedback signal and for amplifying the difference signal; motive means connected to be operated by said difference signal and mechanically connected to position said load element in a direction tending to restore said balanced condition; means for deriving a rate feedback signal commensurate with the velocity of said motive means; and second amplifier means connected to receive said rate feedback signal and arranged to vary its gain as a function of the magnitude of said rate feedback signal for amplifying said rate feedback signal to provide said first feedback signal, said first amplifier means comprising a variable time-constant amplifier operative to reduce its time-constant as said input signal increases.

2. Apparatus according to claim 1 in which said first amplifier comprises a variable time-constant, variable gain amplifier, and in which said second amplifier means comprises a variable gain amplifier, said first amplifier being operable to reduce its gain and time constant by a given factor as said input signal exceeds a predetermined value, and said second amplifier being operable to vary its gain by substantially the same factor as said rate feedback signal exceeds a predetermined value.

3. A position servomechanism operable to automatically increase its bandwidth upon occurrence of increased error signals without diminishing its velocity error coefficient, comprising, in combination: servomotor means mechanically connected to position a load element; means responsive to the position of said load element and operable to provide an error signal; first circuit means including an amplifier for amplifying said error signal to provide a second signal, said first circuit means having a variable time-constant which decreases upon an increase in the magnitude of said error signal; and second circuit means for applying said second signal to operate said servomotor means.

4. Apparatus according to claim 3 in which said first circuit means comprises an amplifier having input and output terminals, a reactive first feedback circuit connected between said input and output terminals, and a resistive second feedback circuit connected between said input and output terminals, and a diode circuit connected to said second feedback circuit and operative to change the impedance of said second feedback circuit in response to a change in the magnitude of said error signal.

5. Apparatus according to claim 3 in which said first circuit means includes an inductor operable to saturate magnetically at a desired error signal level to decrease the time constant of said first circuit means.

6. Apparatus according to claim 3 in which said first circuit means includes a first amplifier, a first diode and a first voltage-variable capacitor, a second amplifier, a second diode and a second voltage-variable capacitor, an output summing device, each of said amplifiers being connected to receive said error signal, the output voltage from said first amplifier being connected through said first diode to charge said first capacitor, the output voltage from said second amplifier being connected through said second diode to charge said second capacitor, said diodes being oppositely-poled, and circuit means for applying the voltages across said voltage-variable capacitors to said output summing device.

7. Apparatus according to claim 3 in which said transducer means operates proportionally over less than ten percent of its operating range and saturates at deviations from a zero signal condition which exceed the linear portion of its operating range.

8. Apparatus according to claim 3 in which said servomechanism includes means for deriving a rate feedback signal commensurate with the rate of change of position of said load element, and circuit means for combining said rate feedback signal with said second signal to operate said servomotor means.

9. A tracking servomechanism system operable to automatically increase its bandwidth upon occurrence of increased deviation from a balanced condition without diminishing its velocity error coefficient, comprising, in combination: error signal generating means responsive to the position of a load element and operative to derive an error signal commensurate with displacement of said servomechanism system from a balanced condition, said error signal generating means having an error signal-versus-displacement characteristic which is linear over less than 10% of the operating range of said error signal generating means and saturated at greater displacements from a zero error signal condition; a variable-gain, variable time constant amplifier means operative to amplify said error signal to provide a second signal, said amplifier means being operable to reduce its time constant and gain by a first predetermined factor as said error signal exceeds a breakpoint value comprising a predetermined percentage of the error signal saturation level; means for comparing said second signal with a third signal and for amplifying the difference signal; motive means connected to be operated by the amplified difference signal and mechanically connected to position said load element in a direction tending to restore said servomechanism system to a balanced condition; means for deriving a rate feedback signal commensurate with the rate of change of position of said motive means; and second amplifier means for modifying said rate feedback signal to provide said third signal, said second amplifier being operable to reduce its gain by a factor equal to or greater than said first predetermined factor as said rate feedback signal exceeds a predetermined value commensurate with the steady-state value of said rate feedback signal at said breakpoint value of said error signal.

References Cited by the Examiner

UNITED STATES PATENTS

| 2,692,358 | 10/54 | Wild | 318—29 |
| 2,760,131 | 9/56 | Braunagel | 318—28 |
| 2,880,384 | 3/59 | Surtees | 318—489 |
| 2,928,035 | 3/60 | Levinson et al. | 318—448 |
| 2,940,026 | 6/60 | Raque | 318—448 |

JOHN F. COUCH, *Primary Examiner*